United States Patent
Takayama et al.

(10) Patent No.: US 9,336,090 B2
(45) Date of Patent: May 10, 2016

(54) STORAGE APPARATUS COMPRISING SNAPSHOT FUNCTION, AND STORAGE CONTROL METHOD

(71) Applicant: Hitachi, Ltd., Tokyo (JP)

(72) Inventors: Yudai Takayama, Odawara (JP); Yuko Matsui, Odawara (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 13/643,457

(22) PCT Filed: Oct. 10, 2012

(86) PCT No.: PCT/JP2012/006499
§ 371 (c)(1),
(2) Date: Feb. 5, 2013

(87) PCT Pub. No.: WO2014/057515
PCT Pub. Date: Apr. 17, 2014

(65) Prior Publication Data
US 2014/0101107 A1    Apr. 10, 2014

(51) Int. Cl.
*G06F 11/14* (2006.01)
*G06F 17/30* (2006.01)
*G06F 3/06* (2006.01)

(52) U.S. Cl.
CPC .......... *G06F 11/1446* (2013.01); *G06F 3/0604* (2013.01); *G06F 3/0638* (2013.01); *G06F 3/0659* (2013.01); *G06F 3/0679* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 8,151,060 B2 | 4/2012 | Mizushima | |
| 8,200,922 B2 | 6/2012 | McKean et al. | |
| 2004/0068636 A1 | 4/2004 | Jacobson et al. | |
| 2008/0126712 A1* | 5/2008 | Mizushima | 711/141 |
| 2010/0125751 A1 | 5/2010 | McKean | |
| 2010/0153620 A1 | 6/2010 | McKean et al. | |
| 2010/0185830 A1* | 7/2010 | Asnaashari et al. | 711/206 |
| 2011/0231605 A1* | 9/2011 | Ogawa et al. | 711/114 |
| 2012/0198130 A1* | 8/2012 | Noborikawa et al. | 711/103 |

FOREIGN PATENT DOCUMENTS

WO    WO 2011/052005 A1    5/2011

OTHER PUBLICATIONS

PCT International Search Report and Written Opinion on application PCT/JP2012/006499 mailed Apr. 5, 2013; 11 pages.

* cited by examiner

*Primary Examiner* — Jared Rutz
*Assistant Examiner* — Charles Choi
(74) *Attorney, Agent, or Firm* — Foley & Lardner LLP

(57) ABSTRACT

Storage apparatus, in response to write command specifying write destination with regards to multiple virtual areas, allocates a free real area of multiple real areas based on storage devices to a write-destination virtual area, of the multiple virtual areas, to which the write destination belongs, and writes write-target data conforming to the write command to the allocated real area. The storage apparatus, where a first write command has been received subsequent to a snapshot acquisition time point, erases an allocation of a first real area to a first virtual area to which the write destination specified in the first write command belongs, allocates the first real area to a free second virtual area to which a real area has not been allocated, allocates a free second real area to the first virtual area, writes write-target data conforming to the first write command to the second real area.

7 Claims, 21 Drawing Sheets

FIG. 2

LU configuration management table
221

| LU# | Logical address range | FMPK# |
|---|---|---|
| 0 | 0x0000~0x00FF | 0 |
| 0 | 0x0100~0x01FF | 1 |
| ... | ... | ... |
| 1 | 0x0000~0x00FF | 0 |
| 1 | 0x0100~0x01FF | 1 |
| ... | ... | ... |

Columns: 201, 202, 203

FIG. 3

Snapshot management table
222

| TP virtual LU# | TP virtual address range | Snapshot information | Snapshot acquisition value |
|---|---|---|---|
| 0 | 0x0000~0x03FF | Primary | 17 |
| 1 | 0x0000~0x15FF | Pool | 0 |
| 2 | 0x0000~0x07FF | OFF | 0 |
| ... | ... | ... | ... |

Columns: 301, 302, 303, 304

FIG. 4

Virtual page management table
223

| TP virtual LU # | TP virtual address | TP virtual page status | SS generation number | Previous-generation-data TP virtual LU # | Previous-generation-data TP virtual address |
|---|---|---|---|---|---|
| 0 | 0x0000 | Valid | 0 | 1 | 0x0030 |
| 0 | 0x0010 | Free | 0 | - | - |
| 0 | 0x0020 | Valid | 0 | 1 | 0x0000 |
| ... | ... | ... | ... | ... | ... |
| 1 | 0x0000 | SS | 9 | FF | 0xFFFF |
| 1 | 0x0010 | Free | 0 | - | - |
| 1 | 0x0020 | SS | 12 | FF | 0xFFFF |
| 1 | 0x0030 | SS | 17 | 1 | 0x0020 |
| ... | ... | ... | ... | ... | ... |
| 2 | 0x0000 | Valid | 0 | - | - |
| ... | ... | ... | ... | ... | ... |

FIG. 6

TP logical address management table
224

| LU# | Logical address | Allocation status | TP virtual LU # | TP virtual address |
|---|---|---|---|---|
| 0 | 0x0000 | Allocated | 0 | 0x0010 |
| 0 | 0x0010 | Unallocated | - | - |
| 0 | 0x0020 | Allocated | 1 | 0x0000 |
| 0 | 0x0030 | Allocated | 1 | 0x0020 |
| ... | ... | ... | ... | ... |
| 1 | 0x0000 | Allocated | 2 | 0x0280 |
| 1 | 0x0010 | Allocated | 0 | 0x0000 |
| 1 | 0x0020 | Unallocated | - | - |
| 1 | 0x0030 | Allocated | 1 | 0x0030 |
| ... | ... | ... | ... | ... |

Columns: 601, 602, 603, 604, 605

FIG. 7

Physical page management table
321

| Physical page # | Physical page status | LU# | SS generation number |
|---|---|---|---|
| 0 | Valid | 0 | 0 |
| 1 | Valid | 0 | 0 |
| ... | ... | ... | ... |
| 7 | Free | 0 | 0 |
| ... | ... | ... | ... |
| 38 | Invalid | 0 | 0 |
| ... | ... | ... | ... |
| 100 | SS | 1 | 9 |
| ... | ... | ... | ... |
| 126 | Free | 1 | 0 |
| ... | ... | ... | ... |

Columns: 701, 702, 703, 704

Logical-physical translation table
322

| LU# | Logical address | Physical page # |
|---|---|---|
| 0 | 0x0000 | 0 |
| 0 | 0x0020 | 1 |
| ... | ... | ... |
| 1 | 0x0000 | 100 |
| 1 | 0x0010 | 101 |
| ... | ... | ... |

801 → LU#
802 → Logical address
803 → Physical page #

Physical block management table
323

| Physical block # | Physical page list | Number of physical pages | Number of erases |
|---|---|---|---|
| 0 | 0~999 | 37 | 69 |
| 1 | 1000~1999 | 459 | 700 |
| 2 | 2000~2999 | 2 | 359 |
| ......... | ......... | ......... | ......... |

901 → Physical block #
902 → Physical page list
903 → Number of physical pages
904 → Number of erases

STORAGE APPARATUS COMPRISING SNAPSHOT FUNCTION, AND STORAGE CONTROL METHOD

TECHNICAL FIELD

The present invention relates to snapshot acquisition control.

BACKGROUND ART

A snapshot function is known as one of the functions of a storage apparatus. According to the snapshot function, an image of a target logical volume at the point in time of a specified snapshot acquisition (a snapshot image) is maintained. That is, even when new data is written to a write-destination area in the target logical volume subsequent to a snapshot acquisition time point, the data in this write-destination area is held without being deleted.

The technology disclosed in Patent Literature 1 is technology related to the snapshot function. In Patent Literature 1, in a case where a certain logical page in a flash memory is used as a write destination for new data, a second physical page into which the new data is to be written is associated anew with the write-destination logical page in addition to a first physical page, which is allocated to the write-destination logical page and is storing the old data. That is, the first physical page in which the old data is stored and the second physical page in which the new data is stored are mapped to the same logical page in the flash memory, and the old data is used as the snapshot.

CITATION LIST

Patent Literature
PTL 1: U.S. Pat. No. 8,151,060

SUMMARY OF INVENTION

Technical Problem

In Patent Literature 1, in a case where the old data is read from the logical page to which the first and the second physical pages are mapped, a read command specifying the reading of the old data, that is, a special command is needed with respect to the logical page.

Solution to Problem

A storage apparatus, in response to a write command specifying a write destination with regards to multiple virtual areas, allocates a free real area from among multiple real areas based on one or more storage devices to a write-destination virtual area to which the write destination of the multiple virtual areas belongs, and writes write-target data conforming to the write command to the allocated real area. In a case where the storage apparatus receives a first write command subsequent to a snapshot acquisition time point, the storage apparatus cancels the allocation of a first real area to a first virtual area to which the write destination specified in the first write command belongs, allocates the first real area to a free second virtual area to which a real area is not allocated, allocates a free second real area to the first virtual area, and writes the write-target data conforming to the first write command to the above-mentioned second real area.

Advantageous Effects of Invention

In a case where a controller reads old data (snapshot data) from the storage device, the controller may send a read command specifying an address of the first real area storing the old data (or an address based on this address) to the storage device storing the old data. That is, the controller can read the old data without a special command for reading the old data.

BRIEF DESCRIPTION OF DRAWINGS

FIG. 2 shows an example of the configuration of an LU configuration management table 221.

FIG. 3 shows an example of the configuration of a snapshot management table 222.

FIG. 4 shows an example of the configuration of a virtual page management table 223.

FIG. 6 shows an example of the configuration of a TP logical address management table 224.

FIG. 7 shows an example of the configuration of a physical page management table 321.

DESCRIPTION OF EMBODIMENTS

The examples explained hereinbelow do not limit the invention related to the claims, and not all of the elements and combinations thereof explained in the examples are essential for the solution provided by the invention.

In the following explanation, various types of information may be explained using the expression "aaa table", but the various information may also be expressed using a data structure other than a table. To show that the various information is not dependent on the data structure, "aaa table" can be called "aaa information".

Furthermore, in the following explanation, a controller, such as at least one of a RAID controller or a memory controller, may be a processor (for example, a CPU (Central Processing Unit)) for executing a computer program, or may include a processor and another device (for example, a memory) or dedicated hardware for performing a prescribed process. The computer program may be installed in either the RAID controller or the memory controller from a program source. The program source, for example, may be either a program delivery server or a portable storage media.

Furthermore, in the following explanation, the information for identifying an element (for example, a LU or a physical page) is a number, but an element may be identified using another type of information either instead of or in addition to a number.

Furthermore, in the following explanation, a reference sign will be used when giving an explanation, which does not make a distinction between elements of the same type (for example, "FMPK 30"), and a serial number will be used instead of the reference sign when giving an explanation, which makes a distinction between elements of the same type (for example, "FMPK #0").

Example 1

Figure 24:
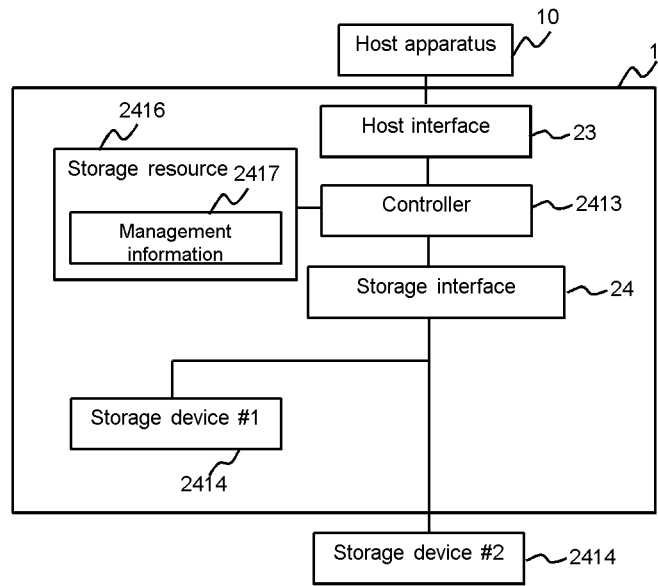
FIG. 24 shows an overview of the configuration of the storage apparatus 1 related to Example 1.

FIG. 24 shows an overview of the configuration of a storage apparatus 1 related to Example 1.

The storage apparatus 1 comprises a host interface 23, which is a communication interface device coupled to a host apparatus 10, a storage interface 24, which is a communication interface device coupled to multiple storage devices 2414, a storage resource (for example, a memory) 2416, and a controller 2413 coupled to the host interface 23, the storage interface 24, and the memory 2416. The controller 2413 receives an I/O (Input/Output) command, such as a write command and a read command, via the host interface 23. In an I/O process conforming to this I/O command, the controller 2413 also sends an I/O command for performing a data I/O with respect to an I/O-destination storage device 2414 to the I/O-destination storage device 2414 from the storage interface 24. The storage device 2414 receives this I/O command, and in response to this I/O command, either writes data, or reads data and sends the read data to the controller 2413. In the I/O command from the host apparatus 10 to the controller 2413, for example, a LU and an address in the LU (or the number of an area in the LU) are specified as the I/O destination (either a write destination or a read source). In the I/O command from the controller 2413 to the storage device 2414, for example, an address is specified as the I/O destination (either the write destination or the read source).

The storage resource 2416 may be either volatile or nonvolatile, and, for example, may include a below-described cache memory for temporarily storing data, which is either written to the storage device 2414 or read from the storage device 2414. The storage resource 2416, for example, stores management information 2417. The management information 2417 will be described further below.

The storage device 2414 is typically nonvolatile, and may be a component of the storage apparatus 1 like storage device #1 (for example, a storage media drive such as a HDD (Hard Disk Drive) or a SSD (Solid State Drive)), or may be an element outside the storage apparatus 1 like storage device #2 (for example, a storage media drive, or an external storage apparatus comprising one or multiple storage media drives). Or, the storage device 2414 may be a storage media, such as a hard disk or a flash memory (a flash memory chip), and, in accordance with this, the storage apparatus 1 may be a storage media drive comprising this storage media.

Figure 25:
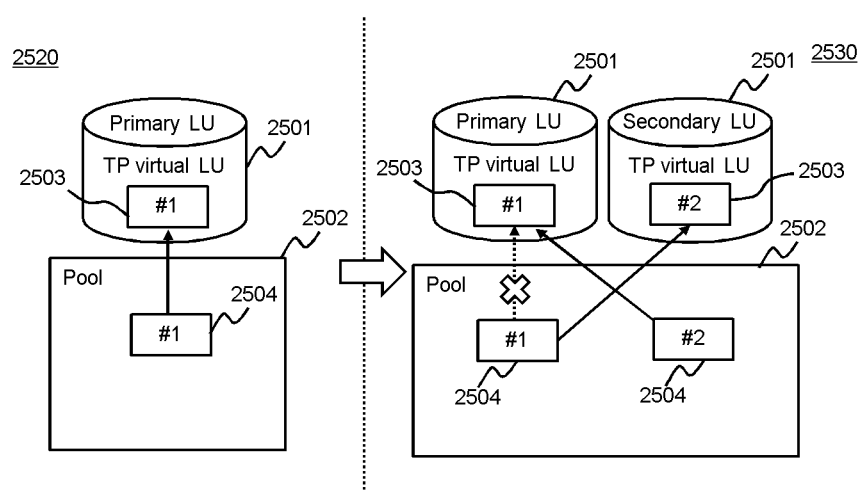
FIG. 25 shows an overview of processing performed by a controller 2413.

FIG. 25 shows an overview of processing performed by the controller 2413.

The controller 2413 manages one or more TP virtual LUs 2501 and a pool 2502.

The TP virtual LU 2501 is a virtual LU (Logical Unit) conforming to TP (Thin Provisioning). The one or more TP virtual LUs 2501 include an online TP virtual LU (hereinafter, primary TP virtual LU), which is the LU provided to the host apparatus 10. The one or more TP virtual LUs 2501 may include an offline TP virtual LU (hereinafter, secondary TP virtual LU), which is a LU that is not provided to the host apparatus 10. The TP virtual LU 2501 is configured using multiple virtual pages 2503.

The pool 2502 is configured using multiple real pages 2504. The real page 2504 may be one element of a pool LU, which configures the pool 2502. The real page 2504 is based on one or more storage devices. Data, which has a real page 2504 as the write destination, is written to one or more storage devices 2414, which constitute the basis of this real page 2504.

As shown in the left side 2520 of FIG. 25, in a case where a real page 2504 has not been allocated to a write-destination virtual page 2503, which belongs to the write destination specified in the write command from the host apparatus 10, the controller 2413 specifies a free real page 2504, allocates the specified real page 2504 to the write-destination virtual page 2503, and, in addition, writes the write data (data conforming to the write command) to the specified real page 2504.

The controller 2413 can hold a snapshot image of the primary TP virtual LU without allocating multiple real pages 2504 to one virtual page 2503. Specifically, the controller 2413 performs the processing shown in the right side 2530 of FIG. 25. That is, in a case where the controller 2413 first receives a write command, which specifies a write destination belonging to a first virtual page #1 to which a first real page #1 (real page in which the old data is being stored) is allocated, from the host apparatus 10 subsequent to the snapshot acquisition time point, the controller 2413 (1) cancels the allocation of the first real page #1 to the first virtual page #1, (2) allocates a second real page #2, which is the write destination of the new data (write data conforming to the write command) to the first virtual page #1, (3) allocates the first real page #1 to a free second virtual page (a virtual page to which none of the real pages 2504 is allocated), and (4) associates the second virtual page #2 with the first virtual page #1. In (4), in a case where another virtual page is already associated with the first virtual page #1, a second virtual page may be allocated to the virtual page, which was allocated to the first virtual page #1 last. That is, the second virtual page #2 may be indirectly allocated to the first virtual page #1. In this example, one or more virtual pages may be associated in series (queue-like) with the virtual page #1 in the primary TP virtual LU. In principle, a virtual page associated with a virtual page in the primary TP virtual LU is a virtual page in the secondary TP virtual LU, but in a case where the virtual page satisfies a prescribed condition (for example, a case in which virtual pages have been exhausted from the relevant LU), a virtual page associated with a virtual page in the primary TP virtual LU may be a virtual page in the secondary TP virtual LU. Also, the snapshot acquisition time point, for example, may be the time point at which the controller 2413 receives a snapshot acquisition command from the host apparatus 10, or may be a time point conforming to a prescribed schedule.

(1) through (4) are performed each time a write command having the first virtual page #1 as the write destination is first received subsequent to the time point of each of multiple snapshot acquisition time points, thereby increasing the virtual pages associated with the first virtual page #1. Data in the real page allocated to the first virtual page #1 last is the latest generation data of the primary TP virtual LU, and data in the real page allocated to the virtual page associated with the first virtual page #1 the furthest in the past is data in the oldest generation snapshot image of the primary TP virtual LU.

The management information 2417 shown in FIG. 24, for example, includes the following information.

(*) Status of real page 2504. The status, for example, includes free and allocated. This information makes it possible to specify which real page 2504 is free.

(*) Mapping relationship between virtual page and real page. This information makes it possible to specify which virtual page is allocated to which real page.

(*) Status of virtual page. The status, for example, includes free and allocated. This information makes it possible to specify whether or not a real page is allocated to a virtual page belonging to a write destination. A free virtual page may be a virtual page to which is allocated a prescribed real page in which an initial value, such as 0 data (data for which all the bits are 0), is stored.

(*) Generation number of data stored in virtual page. This information makes it possible to specify the generation of data stored in a virtual page.

(*) Corresponding relationship between virtual pages. This information makes it possible to specify which virtual page is either directly or indirectly associated with a virtual page in the primary TP virtual LU.

(*) I/O destination information corresponding to real page 2504. The I/O destination information is information constituting a base of either the destination of an I/O command for performing data I/O with respect to a real page 2504, or the I/O destination specified in this I/O command. This information makes it possible to specify what I/O destination should be specified for sending an I/O command to a certain storage device 2414 when data I/O is performed with respect to a certain real page 2504.

Example 1 will be explained in detail hereinbelow. In the following explanation, a virtual page in the primary TP virtual LU may be referred to as "primary virtual page". Also, a real page allocated to a primary virtual page may be referred to as "primary real page". A real page in which data comprising a snapshot (SS) image of the primary TP virtual LU is stored may be referred to as "SS real page". A virtual page to which the SS real page is allocated may be referred to as "SS virtual page". A SS virtual page is either directly or indirectly associated with a primary virtual page. Also, data in an SS virtual page (the data in the SS real page allocated to this SS virtual page) may be referred to as "SS data". The SS data is a component of the snapshot image of the primary TP virtual LU.

Figure 1:
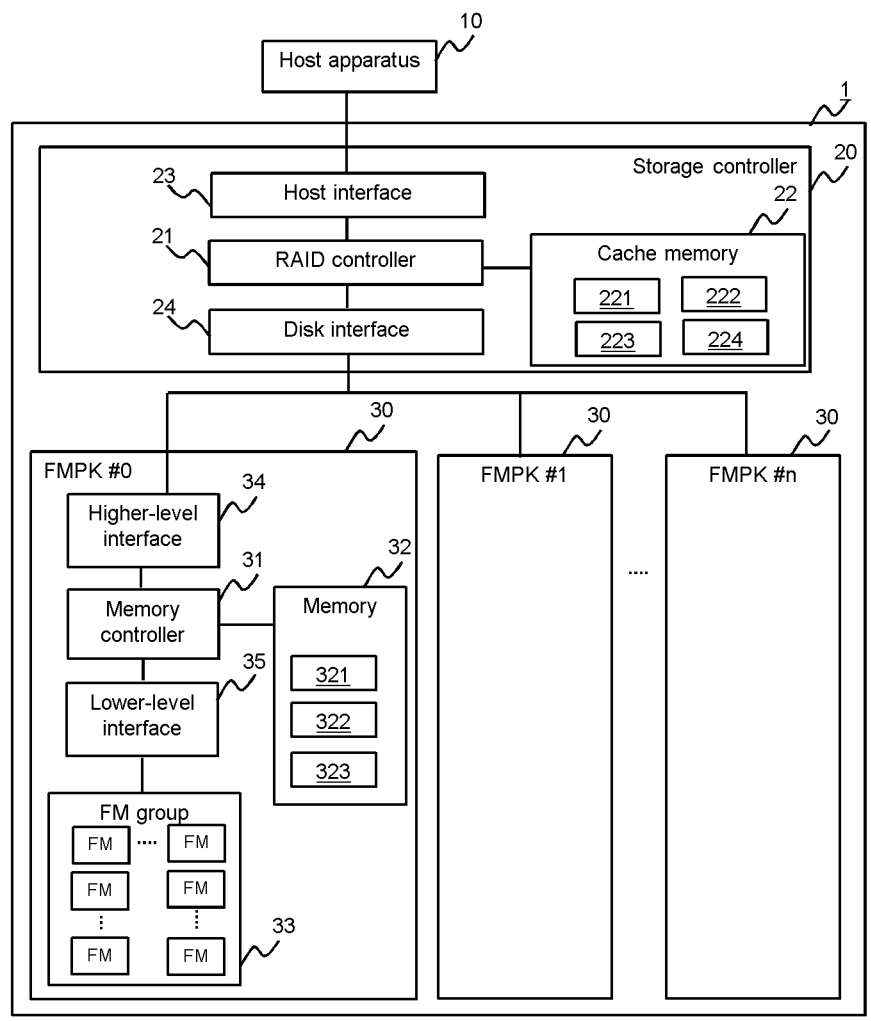
FIG. 1 shows an example of the configuration of a storage apparatus 1 related to Example 1.

FIG. 1 shows an example of the configuration of the storage apparatus 1 related to Example 1.

The storage apparatus 1 is communicably coupled to a higher-level apparatus via a communication network (for example, a LAN (Local Area Network)). In the following explanation, the higher-level apparatus may be another storage apparatus, but in this example, it is supposed that the higher-level apparatus is the host apparatus 10.

The storage apparatus 1 comprises multiple FMPK (Flash Memory Packages) 30, and a storage controller 20 coupled thereto. In the storage apparatus 1 shown in the drawing, multiple FMPKs #0 through #n are stored in an enclosure comprising the storage controller 20, but at least one of the multiple FMPKs #0 through #n need not be stored in the same enclosure.

The storage controller 20 comprises a cache memory 22, a host interface 23, a storage interface 24, and a RAID controller 21 coupled thereto.

The host interface 23 is a communication interface device coupled to the host apparatus 10. The storage interface 24 is a communication interface device coupled to the FMPK 30.

The RAID controller 21 is an example of the controller 2413, and, for example, is an ASIC (Application Specific Integrated Circuit), which includes a CPU. The RAID controller 21, for example, in accordance with executing a computer program, performs such processing as providing a logical volume to the host apparatus 10, and sending an I/O command to a FMPK 30 in accordance with an I/O (Input/Output) command (either a write command or a read command), which specifies the logical volume.

The cache memory 22 is an example of the memory included in the storage resource 2416, and temporarily stores data, which is inputted/outputted to/from the FMPK 30. The cache memory 22, as shown in the drawing, may store tables 221 through 224. The tables 221 through 224 are examples of information included in the management information 2417, and may be stored in a storage area other than the cache memory 22, for example, in a storage area in the RAID controller 21.

The FMPK 30 is an example of a flash memory device (for example, a SSD), and comprises a FM group 33. A RAID (Redundant Arrays of Inexpensive Disks) group is configured using two or more FMPKs 30. The storage apparatus 1 comprises either one or multiple RAID groups.

Each FMPK 30 comprises a memory 32, a FM group 33, a higher-level interface 34, a lower-level interface 35, and a memory controller 31 coupled thereto.

The memory controller 31 controls the entire FMPK 30. The memory 32 stores tables 321 through 323 for managing the FMPK 30. The memory 32 may also store a computer program executed by the memory controller 31.

The FM group 33 comprises multiple (or one) FMs (Flash Memory). The FM, for example, is a NAND type, and comprises multiple blocks (physical blocks). Each physical block is configured using multiple pages (physical pages).

The higher-level interface 34 is a communication interface device for communicating with the storage controller 20. The lower-level interface 35 is a communication interface device for communicating with multiple FMs.

FIG. 2 shows an example of the configuration of a LU configuration management table 221.

The LU configuration management table 221 comprises information related to a real LU managed by the storage apparatus 1. Specifically, for example, the LU configuration management table 221 correspondingly stores a LU #201, a logical address range 202, and a FMPK #203 for each LU.

The LU #201 is the identification number of a LU (logical volume).

The logical address range 202 is information showing a range of logical addresses allocated to the LU. The range of addresses shown by the logical address range 202 may be the same values as the range of addresses of a logical space provided by the FMPK 30, or different values. In the case of the former, an I/O command in which the LU address (address of a real page in the LU) is specified may be sent from the storage controller 20 to the FMPK 30. In the case of the latter, an address of a logical space provided by the FMPK 30 may be specified based on the LU address (address of a real page in the LU), and an I/O command in which the specified address is specified may be sent from the storage controller 20 to the FMPK 30.

The FMPK #203 is the LU-based identification number of an FMPK.

FIG. 3 shows an example of the configuration of a snapshot management table 222.

The snapshot management table 222 comprises information related to a snapshot of a TP virtual LU. Specifically, for example, the snapshot management table 222 stores a TP virtual LU #301, a TP virtual address range 302, snapshot information 303, and a snapshot acquisition value 304 for each TP virtual LU. A latest SS generation number is also stored in the snapshot management table 222.

The TP virtual LU #301 is the identification number of a TP virtual LU.

The TP virtual address range 302 is information showing a range of addresses allocated to the TP virtual LU 301.

The snapshot information 303 is information showing how the TP virtual LU is being used. In the example shown in the drawing, the snapshot information 303 includes "primary", "pool", and "OFF". "Primary" shows that the TP virtual LU is used as the primary TP virtual LU of the snapshot. "Pool" shows that the TP virtual LU is being used as a snapshot pool. That is, there is one pool TP virtual LU in the one or multiple primary TP virtual LUs, and the SS virtual page, which is allocated to the primary virtual page, is selected from the pool TP virtual LU. The pool TP virtual LU is one of the LUs other than the primary TP virtual LU, and is an example of the secondary TP virtual LU described hereinabove. "OFF" shows that the TP virtual LU is neither the primary TP virtual LU nor the pool TP virtual LU.

The snapshot acquisition value 304 is information showing the number of snapshots acquired with respect to the primary TP virtual LU. This information shows the latest SS (snapshot) generation number.

FIG. 4 shows an example of the configuration of a virtual page management table 223.

The virtual page management table 223 comprises information related to a virtual page. For example, the virtual page management table 223 correspondingly stores a TP virtual LU #401, a TP virtual address 402, a TP virtual page status 403, a SS generation number 404, a previous-generation-data TP virtual LU #405, and a previous-generation-data TP virtual address 406 for each virtual page.

The TP virtual LU #401 is the identification number of a TP virtual LU comprising a virtual page.

The TP virtual address 402 is the logical address of the virtual page.

The TP virtual page status 403 is information showing the state of a virtual page. In the example shown in the drawing, the TP virtual page status 403 includes "valid", "free", and "SS". "Valid" shows that the latest data is stored in a real page allocated to the virtual page. "Free" shows that the virtual page is a free virtual page (a virtual page to which none of the real pages is allocated). "SS" shows that snapshot data (an element of an SS image) is stored in the real page allocated to the virtual page.

The SS generation number 404 is information showing the generation of the snapshot image data stored in a virtual page having a TP virtual page status 403 of "SS". In the example shown in the drawing, data having a larger SS generation number 404 is newer SS generation data. Furthermore, the SS generation number 404 for a virtual page for which the TP virtual page status 403 is not "SS" is configured to "0".

The previous-generation-data TP virtual LU #405 is the identification number of an LU comprising the virtual page, which is storing the previous generation data of the virtual page-stored data. That is, in this example, one or more SS virtual pages are associated in series with the primary virtual page, but the previous-generation-data TP virtual LU #405 is the identification number of the LU comprising a virtual page, which is directly associated with the target virtual page and which is a posterior virtual page (an older generation virtual page, hereinafter a previous generation SS virtual page). Furthermore, in the example shown in the drawing, in a case where the target virtual page is the final virtual page (the virtual page storing the oldest generation data), "FF" is stored as the previous-generation-data TP virtual LU #405. For a free virtual page, "-" is stored as the previous-generation-data TP virtual LU #405.

The previous-generation-data TP virtual address 406 is information showing the logical address of the previous generation SS virtual page of the virtual page. In the example shown in the drawing, in a case where the target virtual page is the final virtual page (the virtual page storing the oldest generation data), "0xFFFF" is stored as the previous-generation-data TP virtual address 406. In a case where the virtual page is a free virtual page, "-" is stored as the previous-generation-data TP virtual address 406.

Figure 5:
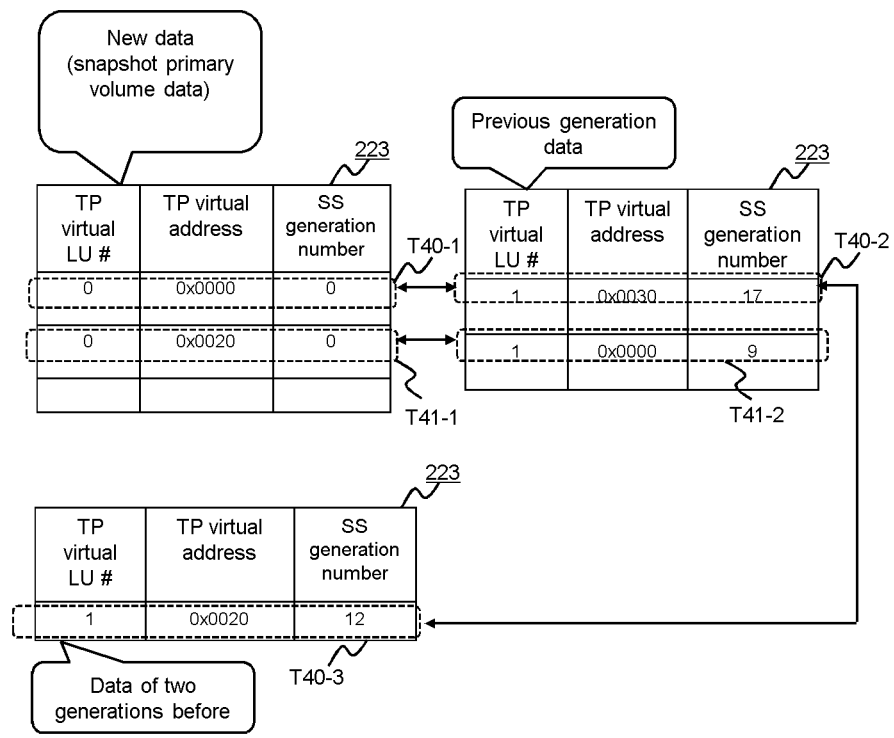
FIG. 5 shows an association between a primary virtual page and one or more SS virtual pages.

FIG. 5 shows the association between the primary virtual page and one or more SS virtual pages. Specifically, FIG. 5 shows the relationship between a row corresponding to the primary virtual page and a row corresponding to an SS virtual page with respect to the virtual page management table 223 shown in FIG. 4. FIG. 5 extracts the information 401, 402, and 404 from FIG. 4 with respect to the identified virtual page. Therefore, T40-1 through T40-3 and T41-1 and T41-2 enclosed within the dotted-line boxes of FIG. 5 correspond to T40-1 through T40-3 and T41-1 and T41-2 enclosed within the dotted-line boxes of FIG. 4.

According to FIG. 5 (and FIG. 4) one or more SS virtual pages are associated in series with the primary virtual page. The closer an SS virtual page is to the primary virtual page, the closer the generation of data in the SS virtual page is to the latest generation.

According to FIG. 5 (and FIG. 4), the SS virtual page #0x0030 of TP virtual LU #1 is directly associated with the primary virtual page #0x0000 of the TP virtual LU #0, and the SS data stored in this SS virtual page #0x0030 is SS data of previous generation "17". The SS virtual page #0x0020 of TP virtual LU #1 is directly associated with this virtual page (SS virtual page #0x0030 of TP virtual LU #1), and the SS data stored in this SS virtual page #0x0020 is SS data of the more previous generation "12". This SS virtual page #0x0020 is the final SS virtual page of the one or more SS virtual pages associated with the primary virtual page #0x0000.

According to FIG. 5 (and FIG. 4), the SS virtual page #0x0000 of TP virtual LU #1 is directly associated with the primary virtual page #0x0020 of the TP virtual LU #0, and the SS data stored in this SS virtual page #0x0000 is SS data of previous generation "9". This SS virtual page #0x0000 is the final SS virtual page of the one or more SS virtual pages associated with the primary virtual page #0x0020.

Thus, the number of associated SS virtual pages may differ in accordance with the primary virtual page.

Since not all primary virtual pages are updated subsequent to all snapshot acquisition time points, multiple generation numbers respectively corresponding to the multiple SS virtual pages associated with the primary virtual page are not necessarily serial numbers. In the example of FIG. 5, the SS data of generations "13" through "16" are not acquired in relation to the primary virtual page #0x0000 of TP virtual LU #0, but the SS data of generations "13" through "16" are the same as the SS data of generation "12". For this reason, in order to acquire missing generational SS data like the SS data of generations "13" through "16" with respect to the primary virtual page #0x0000, the closest generation of SS data held in a generation previous to the missing generations may be read.

FIG. 6 shows an example of the configuration of a TP logical address management table 224.

The TP logical address management table 224 represents a corresponding relationship between a virtual page and a real page. For example, the TP logical address management table 224 correspondingly stores a LU #601, a logical address 602, an allocation status 603, a TP virtual LU #604, and a TP virtual address 605 for each real page.

The LU #601 is the identification number of a LU comprising a real page.

The logical address 602 is information showing the logical address of the real page.

The allocation status 603 shows whether or not the real page is allocated to a virtual page. In the example shown in the drawing, the allocation status 603 includes "allocated" and "unallocated". "Allocated" shows that the real page is allocated to a virtual page. "Unallocated" shows that the real page is a free real page, which is not allocated to any virtual page.

The TP virtual LU #604 is the identification number of the TP virtual LU comprising the allocation-destination virtual page of a real page for which the allocation status 603 is "allocated". "-" is stored as TP virtual LU #604 when the allocation status 603 is "unallocated".

The TP virtual address 605 is information showing the address of the allocation-destination virtual page of the real page for which the allocation status 603 is "allocated". "-" is stored as TP virtual address 605 when the allocation status 603 is "unallocated".

FIG. 7 shows an example of the configuration of a physical page management table 321.

The physical page management table 321 comprises information related to each physical page of the FMPK 30, which comprises this table 321. A physical page is a component of a physical block, which configures each FM of the FMPK 30, and differs from a real page, which is a component of a pool. A logical page corresponds to a real page. A logical page, which corresponds to a real page, may be the real page itself, or may be a storage area separate from the real page. One logical page may correspond to one real page, or multiple logical pages may correspond to one real page. In the case of the latter, for example, two or more logical pages, which are respectively provided by two or more FMPKs 30 configuring a RAID group, may be associated with one real page. In this example, one logical page, which is provided by one FMPK 30 constituting the basis of one real page, corresponds to this one real page.

The physical page management table 321 correspondingly stores a physical page #701, a physical page status 702, a LU #703, and a SS generation number 704 for each physical page.

The physical page #701 is the identification number of a physical page.

The physical page status 702 is information showing the state of the physical page. In the example shown in the drawing, the physical page status 702 includes "valid", "free", "invalid", and "SS". "Valid" here shows a state in which valid data is stored in the physical page. "Free" shows a state in which data is not stored in the physical page. "Invalidity" shows a state where it is not referred to from a RAID controller, although invalid data is stored in the physical page. "SS" shows a state in which SS data is stored in the physical page.

The LU #703 is the identification number of an LU comprising the real page corresponding to the allocation-destination logical page of the physical page.

The SS generation number 704 shows the generation number of the SS data stored in the physical page (more precisely, the real page corresponding to the allocation-destination logical page of the physical page). The SS generation number 704 is "0" here with respect to a physical page for which the physical page status 702 is not "SS".

Because a flash memory possesses characteristics that make it impossible to overwrite data, data, which has a logical page as a new write destination, is written to a free physical page that differs from the physical page allocated to this logical page, this free physical page becomes a valid page (a physical page which is "valid"), and the physical page allocated to the logical page becomes an invalid page (a physical page which is "invalid"). In a reclamation process, when all the physical pages configuring one physical block become invalid pages, an erase process can be performed for this physical block. This makes it possible for this physical block to transition to a free physical block.

A SS generation number 704 is stored for each physical page, and this number 704, for example, can be updated as follows. For example, when the storage controller 20 changes the allocation destination of a certain target real page from the primary virtual page to the SS virtual page, the FMPK 30, which constitutes the basis of this target real page, is notified of the post-update SS generation number of this target real page, the memory controller 31 in this FMPK 30 receives this notification, and can specify the physical page allocated to this target real page, can associate this notified SS generation number with this physical page, and, in addition, can update the status of this physical page to "SS".

Figures 8, 9, 10:
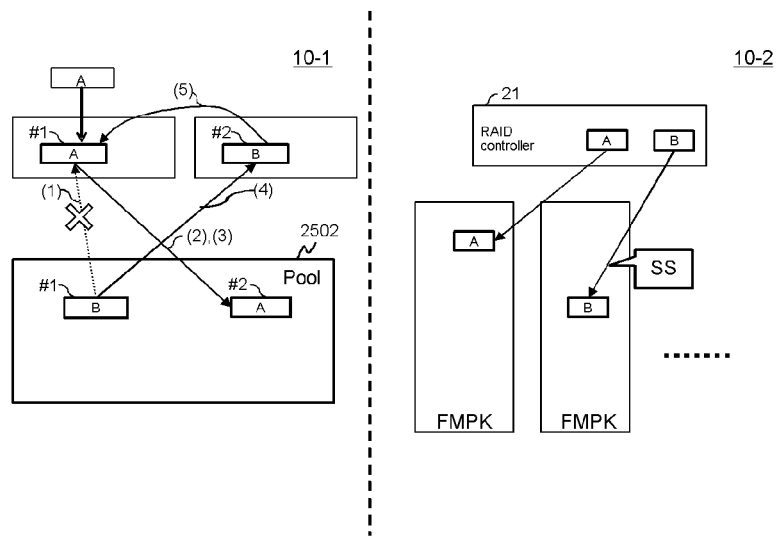
FIG. 8 shows an example of the configuration of a logical-physical translation table 322.
FIG. 9 shows an example of the configuration of a physical block management table 323.
FIG. 10 shows an overview of processing performed when old data B in a primary virtual page is updated to new data A.

FIG. 8 shows an example of the configuration of a logical-physical translation table 322.

The logical-physical translation table 322 is for specifying a physical page from a logical page specified in an I/O command from the storage controller 20. For example, the logical-physical translation table 322 correspondingly stores a LU #801, a logical address 802, and a physical page #803 for each logical page.

The LU #801 is the specification number of a LU comprising a real page, which corresponds to a logical page.

The logical address 802 shows the logical address allocated to the logical page.

The physical page #803 is the identification number of a physical page allocated to the logical page.

FIG. 9 shows an example of the configuration of a physical block management table 323.

The physical block management table 323 comprises information related to each physical block. For example, the physical block management table 323 correspondingly stores a physical block #901, a physical page list 902, a number of physical pages 903, and a number of erases 904 for each physical block.

The physical block #901 is the identification number of a physical block.

The physical page list 902 is information showing a list of physical pages in the physical block by physical page #.

The number of physical pages 903 is information showing the number of invalid pages in the physical block.

The number of erases 904 is information showing the number of times erase processing has been performed for the physical block. In a NAND-type FM, the reading and writing of data are performed in units of physical pages, and erase processing is performed in units of physical blocks. For example, a WL (Wear Leveling) process for making the number of erases uniform can be preformed based on the number of erases of each physical block.

FIG. 10 shows an overview of processing performed when old data B in a primary virtual page is updated to new data A.

It is supposed that subsequent to the snapshot acquisition time point (for example, the time point at which a snapshot acquisition command was received from the host apparatus 10), the RAID controller 21 receives from the host apparatus 10 a write command, which specifies a write destination belonging to the allocation-destination primary virtual page #1 of the real page #1 storing the old data B. It is supposed that write data conforming to this write command is the new data A.

In accordance with this, the RAID controller 21, as shown in area 10-1 on the left side of FIG. 10, (1) releases the allocation of real page #1 to the primary virtual page #1, (2) allocates a free real page #2 to the primary virtual page #1, (3) writes the new data A to the real page #2, (4) allocates the real page #1 to a free virtual page #2, and (5) associates an SS virtual page #2 with the primary virtual page #1.

Also, as shown in the area 10-2 on the right side of FIG. 10, when the RAID controller 21 allocates the real page #1 to the virtual page #2, the RAID controller 21 may also send a notification specifying the address of the real page #2 and the post-update SS generation number of the old data B to the FMPK 30 constituting the basis of the real page #2. The memory controller 31 in this FMPK 30 receives this notification, and can specify from the logical-physical translation table 322 the physical page corresponding to the real page #2 (logical page) to which the address specified in this notification belongs, can associate the SS generation number specified in the notification with the specified physical page, and, in addition, can configure the status of the specified physical page to "SS".

Figure 11:
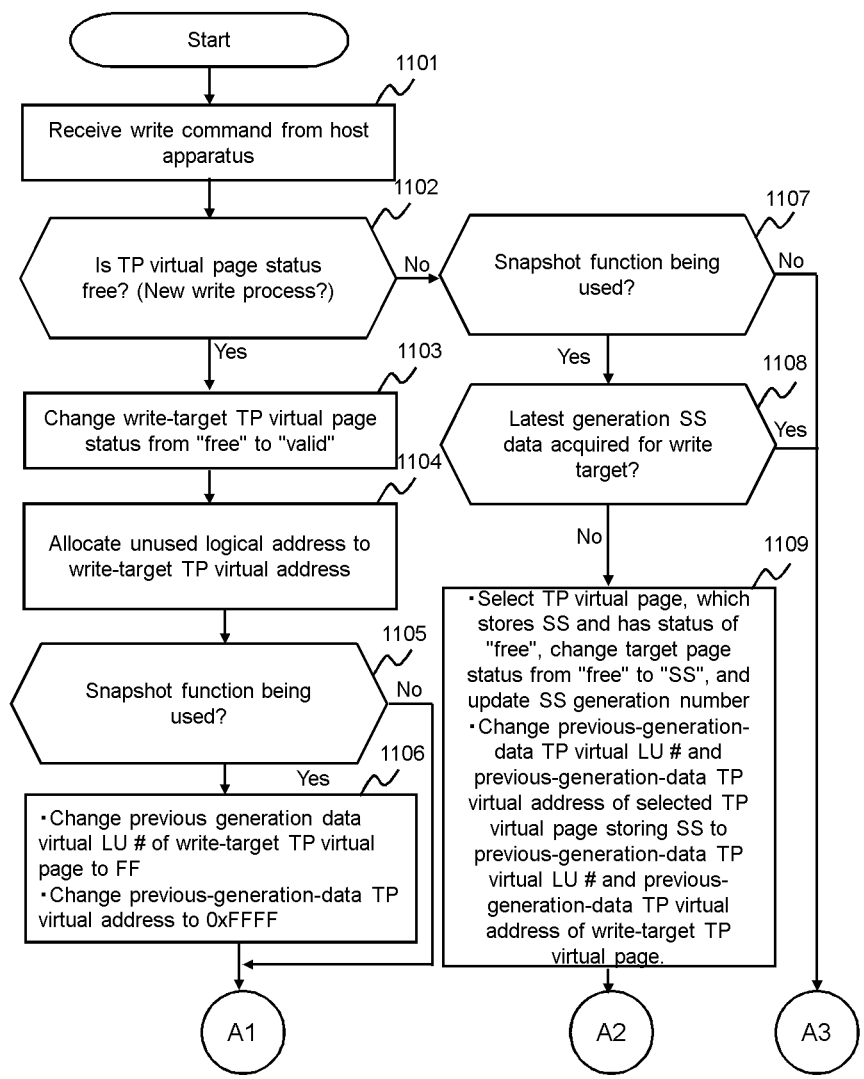
FIG. 11 shows an example of a write process performed by a RAID controller 21.
Figure 12:
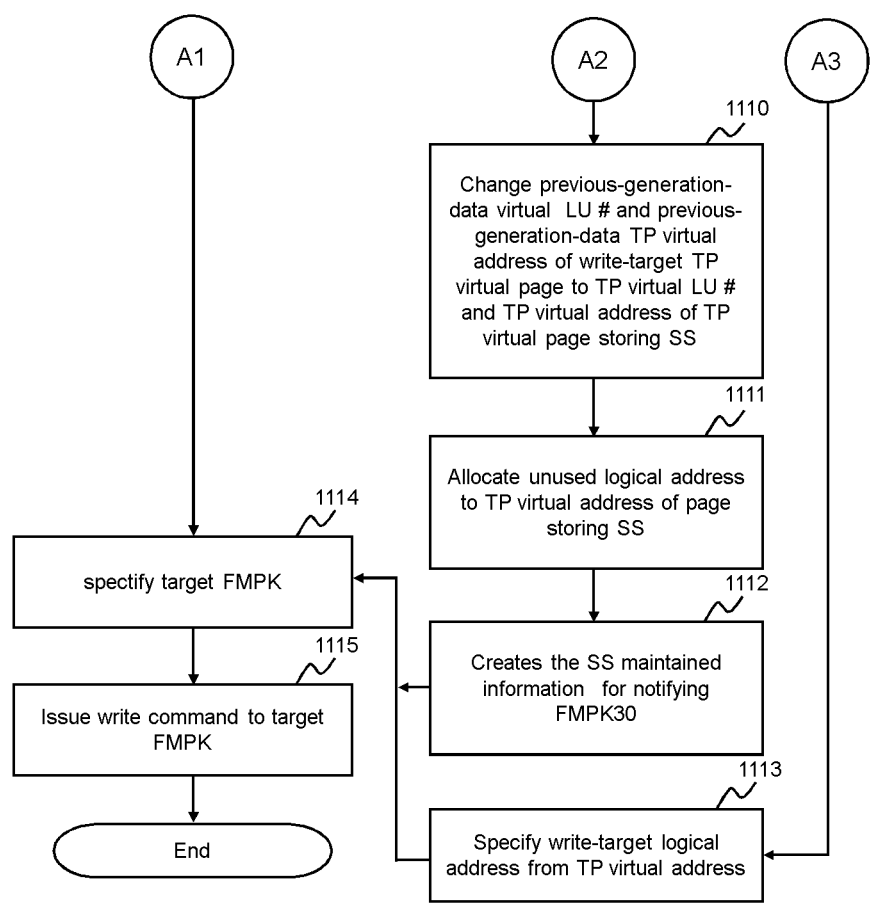
FIG. 12 shows the remainder of the example of the write process performed by the RAID controller 21.

FIGS. 11 and 12 show an example of a write process performed by the RAID controller 21.

The RAID controller 21 receives a write command from the host apparatus 10, and writes write data (write-target data) conforming to the received write command to the cache memory 22 (S1101).

The RAID controller 21 determines whether the write data is new write data or overwrite data (S1102). In this process, the RAID controller 21 can make a determination based on the TP virtual page status 403 of the virtual page management table 223 of FIG. 4. That is, the RAID controller 21 determines that the write data is overwrite data when the TP virtual page status 403 of the write-destination TP virtual address (primary virtual page) is "valid", and determines that the write data is new write data when the TP virtual page status 403 of the write-destination TP virtual address (original virtual page) is "free".

In a case where the write data is new write data (S1102: Yes), the RAID controller 21 changes the TP virtual page status 403 of the virtual page management table 223 from "free" to "valid" with respect to the write-destination primary virtual page (S1103).

The RAID controller 21 allocates a logical address, which is not being used (a real page for which the allocation status 603 is "unallocated") to the write-destination TP virtual address, and adds the allocated real page (logical address) and the number of the LU comprising this real page as the LU #601 and the logical address 602 corresponding to the write-destination TP virtual address (S1104).

The RAID controller 21 determines whether or not the write-destination TP virtual LU is using the snapshot function (S1105). In this processing, the RAID controller 21 makes a determination on the basis of the snapshot management table 222. That is, the RAID controller 21 determines that the TP virtual LU is using the snapshot function in a case where snapshot information 303 corresponding to the write-destination TP virtual LU is "primary".

In a case where the snapshot function is being used (S1105: Yes), the data written to the write-destination primary virtual page is data being written to the write-destination primary virtual page for the first time subsequent to the snapshot acquisition time point, and as such, SS data of a generation previous to this data does not exist. Therefore, the RAID controller 21 configures the previous-generation-data TP virtual LU #405 of the write-destination virtual page to "FF", and, in addition, configures the previous-generation-data TP virtual address 406 to "0xFFFF" (S1106).

Alternatively, in a case where the write data is not new write data (S1102: No), the RAID controller 21 determines whether or not the write-destination TP virtual LU is using the snapshot function (S1107).

In a case where the snapshot function is being used (S1107: Yes), the RAID controller 21 determines whether the latest generation of SS data is being acquired with respect to the write-destination primary virtual page (S1108). The RAID controller 21 can make a determination about this process based on the snapshot management table 222 and the virtual page management table 223. Specifically, for example, the RAID controller 21 determines whether or not the value of the SS generation number 404 corresponding to the SS virtual page directly associated with the write-destination primary virtual page is the same as the snapshot acquisition value 304 corresponding to the write-destination TP virtual LU. When the two values differ, the latest generation of SS data has not been acquired, and when the two values are the same, the latest generation of SS data has been acquired.

In a case where the latest generation SS data is not acquired (S1108: No), a process for changing the data in the primary real page to SS data is performed (S1109). Specifically, for example, the RAID controller 21 performs the following processing:

(*) selection of a free virtual page from the pool TP virtual LU based on the virtual page management table 223;

(*) updating of the SS generation number 404 of the selected virtual page to the number of the latest generation; and (*) change in the previous-generation-data TP virtual LU #405 and the previous-generation-data TP virtual address 406 to the previous-generation-data TP virtual LU #405 and the previous-generation-data TP virtual address 406, respectively, of the write-destination primary virtual page with respect to the selected virtual page.

The RAID controller 21 associates the virtual page (SS virtual page) selected in S1109 with the primary virtual page (S1110). That is, the RAID controller 21 changes the previous-generation-data TP virtual LU #405 and the previous-generation-data TP virtual address 406 of the write-destination primary virtual page to the TP virtual LU #401 and the TP virtual address 402, respectively, of the SS virtual page selected in S1109. (S1110).

The RAID controller 21 allocates the real page, which is storing the latest generation SS data, to the SS virtual page (TP virtual address) selected in S1109 (S1111). The RAID controller 21 writes the TP virtual address of the allocation-destination SS virtual page as the TP virtual address 605 corresponding to the allocated real page. Because a new SS virtual page is assigned for the real page memorizing the latest generation SS data by this processing, the latest generation SS data is not overwritten.

The RAID controller 21 creates the information meaning SS data need to be maintained (hereinafter SS maintained information) (S1112). This SS maintained information may also specify the number of the latest generation.

In a case where either the result of the determination on S1107 is negative (S1107: No) or the result of the determination of S1108 is affirmative (S1108: Yes), the RAID controller 21 specifies the logical address of the write-destination real page corresponding to the write-destination primary virtual page based on the TP logical address management table 224 (S1113).

Subsequent to S1106, S1112 or S1113, the RAID controller 21 uses the LU configuration management table 221 to specify a target FMPK 30 (S1114). The target FMPK is the FMPK, which constitutes the basis of the write-destination primary real page allocated to the write-destination primary virtual page.

The RAID controller 21 issues a write command for writing write data to the FMPK 30 specified in S1114 (S1115). The write-target data is written to the real page in accordance with this. In addition, when SS maintained information is created by S1112, SS maintained information is added to the write command issued by S1115. Moreover, the write destination specified by the write command may be the logical address of the write destination primary real page.
If one real page is based on a plurality of FMPKs 30 which constitute a RAID group, the write destination specified by the write command, may be a logical address specified based on the logical address of the write destination real page (logical address of the logic space which is provided by FMPK 30 which is a send destination of the write command).

Figure 13:
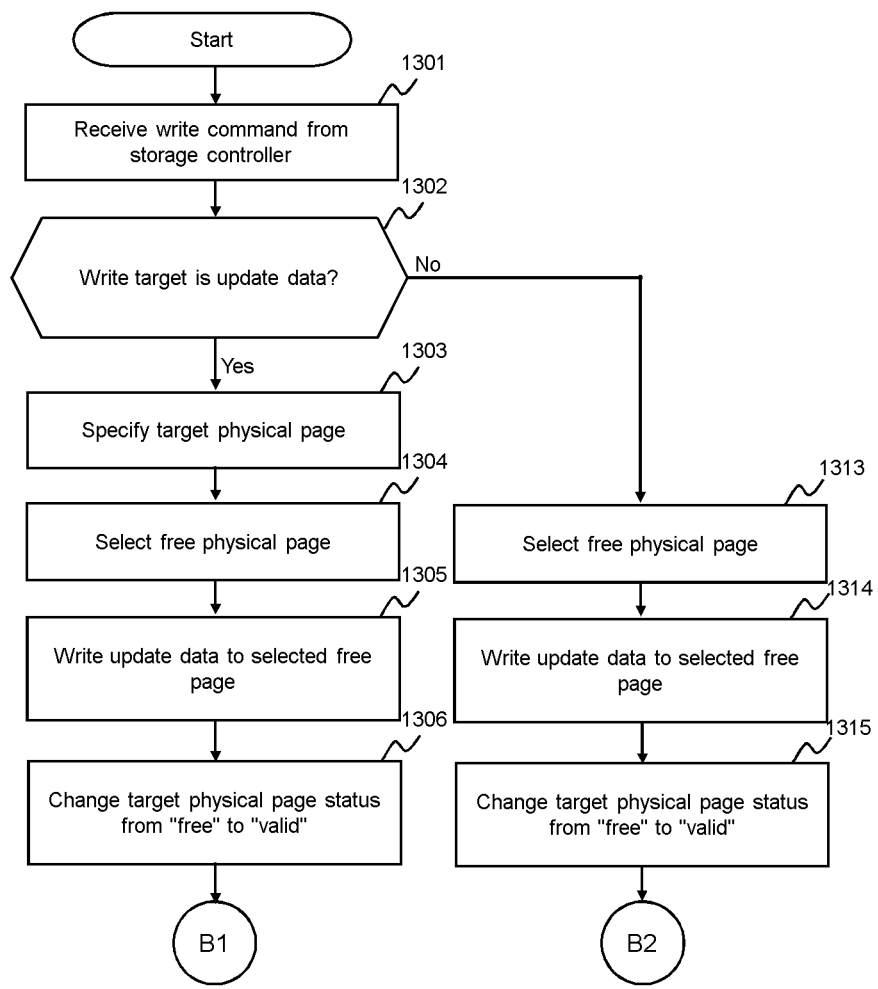
FIG. 13 shows an example of a write process performed by a memory controller 31 of an FMPK 30.
Figure 14:
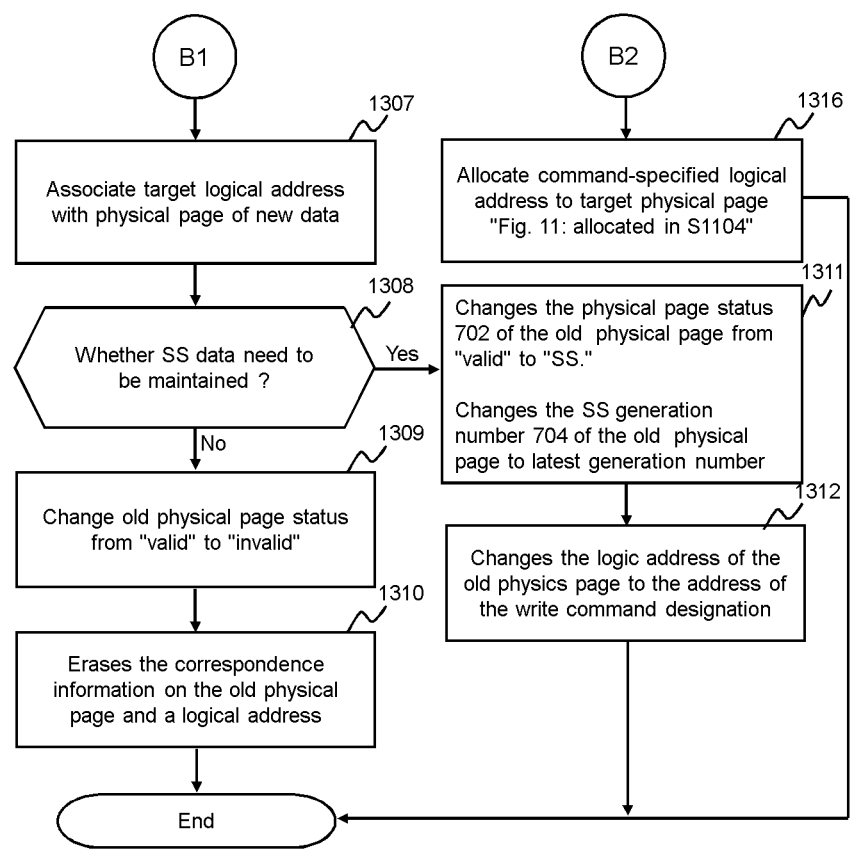
FIG. 14 shows the remainder of the example of the write process performed by the FMPK 30 memory controller 31.

FIGS. 13 and 14 show an example of a write process performed by the memory controller 31 of the FMPK 30.

The memory controller 31 receives the write command from the RAID controller 21 (S1301).

The memory controller 31 determines whether the write data is new write data or update data (S1302). In this process, the FMPK 30 uses the logical-physical translation table 322 to determine whether or not the write-destination logical address specified in the write command is a logical address to which a physical page is already allocated. In a case where a physical page is already allocated, the write data is update data. In a case where a physical page is not allocated, the write data is new write data.

In a case where the write data is update data (S1302: Yes), the memory controller 31 specifies the physical page (the physical page in which old data is stored) allocated to the write-destination logical address (S1303).

To write the update data, the memory controller 31 selects a free physical page based on the physical page management table 321 (S1304). In the FM, data is typically written to the physical pages in sequence from the first physical page to the final physical page. Therefore, the physical page selected in S1304 is typically the first physical page in the physical block.

The memory controller 31 writes the update data to the physical page selected in S1304 (S1305). In a case where the size of the update data is smaller than the size of the physical page, in S1305, the old data is read from the physical page storing the old data, the update data is written to a portion of the old data, and a set comprising the update data and the old data part is written to the physical page selected in S1304.

The memory controller 31 changes the status 702 of the page selected in S1304 to "valid" (S1306).

The memory controller 31 changes the physical page #322 corresponding to the logical address (logical page) specified in the write command to the number of the physical page selected in S1304 (S1307).

The memory controller 31 determines whether SS data need to be maintained (S1308). Specifically, the memory controller 31 determine SS maintained information is included in the write command received from the storage controller 20.

When SS data does not need to be maintained (S1308: No), the memory controller 31 invalidates the old data (S1309). Specifically, the memory controller 31 configures the physical page status 702 corresponding to the physical page storing the old data to "invalid". The data (invalid data) stored in the invalid page (the physical page for which the physical page status 702 has transitioned to "invalid") becomes an erase target. When all the data in the physical block has become invalid data, erase processing can be performed for this physical block. In a case where data has been erased from the physical block, the memory controller 31 increments the number of erases 904 corresponding to this physical block by "1".

The memory controller 31 erases the correspondence information on the old physical page (which is the physical page storing the old data) and a logical address (S1310).

When SS data need to be maintained (S1308: yes), the memory controller 31 changes the physical page status 702 of the old physical page from "valid" to "SS" and changes the SS generation number 704 of the old physical page to latest generation number (S1311).

The memory controller 31 changes the logic address of the old physics page to the address of the write command designation (S1312).

In a case where the write data is new write data (1302: No), the memory controller 31 uses the physical page management table 321 to select a free physical page (S1313).

The memory controller 31 writes the new write data to the physical page selected in S1313 (S1314).

The memory controller 31 configures the status 702 of the physical page selected in S1313 to "valid" (S1315).

The memory controller 31 changes the physical page #803 corresponding to the write-destination logical address 802 in the logical-physical translation table 322 to the number of the physical page selected in S1313 (S1316).

Figure 15:
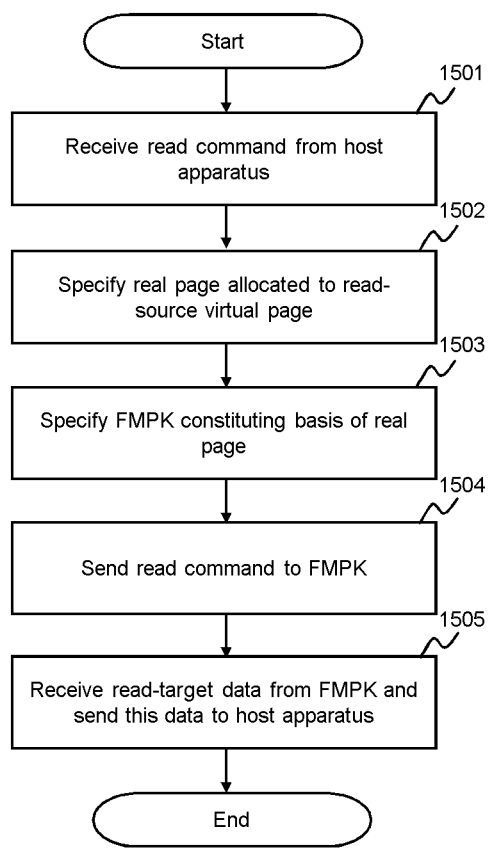
FIG. 15 shows an example of a read process performed by the RAID controller 21.

FIG. 15 shows an example of a read process performed by the RAID controller 21.

The RAID controller 21 receives a read command from the host apparatus 10 (S1501).

The RAID controller 21 uses the TP logical address management table 224 to identify the real page (the LU #601 and the logical address 602) allocated to a read-source virtual page (the TP virtual LU # and the TP virtual address) specified in the read command (S1502).

The RAID controller 21 uses the LU configuration management table 221 to identify the FMPK, which constitutes the basis of the real page (logical address) specified in S1502 (S1503).

The RAID controller 21 sends the read command to the FMPK 30 specified in S1503 (S1504). The logical address of the real page specified in S1502 is specified in the read command. If one real page is based on a plurality of FMPKs 30 which constitute a RAID group, the read source specified by the read command, may be a logical address specified based on the logical address of the read source real page (logical address of the logic space provided by FMPK 30 which is a send destination of the read command).

The RAID controller 21 writes the data read in response to the read command sent in S1504 to the cache memory 22, and sends this data from the cache memory 22 to the host apparatus 10 (S1505).

Figure 16:
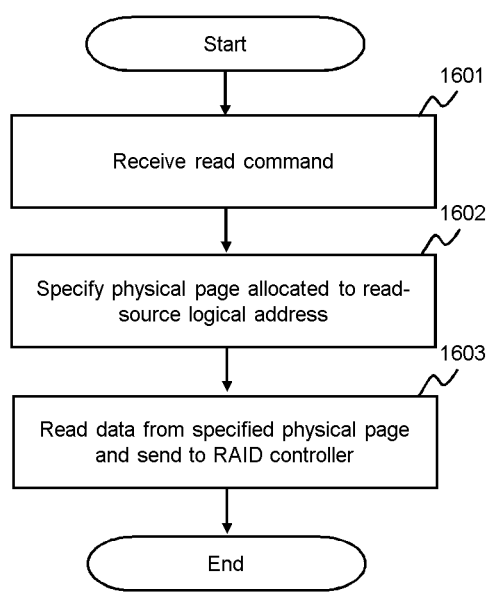
FIG. 16 shows an example of a read process performed by the FMPK 30 memory controller 31.

FIG. 16 shows an example of a read process performed by the memory controller 31 of the FMPK 30.

The memory controller 31 receives the read command from the RAID controller 21 (S1601).

The memory controller 31 uses the logical-physical translation table 322 to identify the physical page allocated to a logical address specified in the read command from the RAID controller 21 (S1602).

The memory controller 31 reads data conforming to the read command from the physical page specified in S1602, and sends the read data to the RAID controller 21 (S1603)

Figure 17:
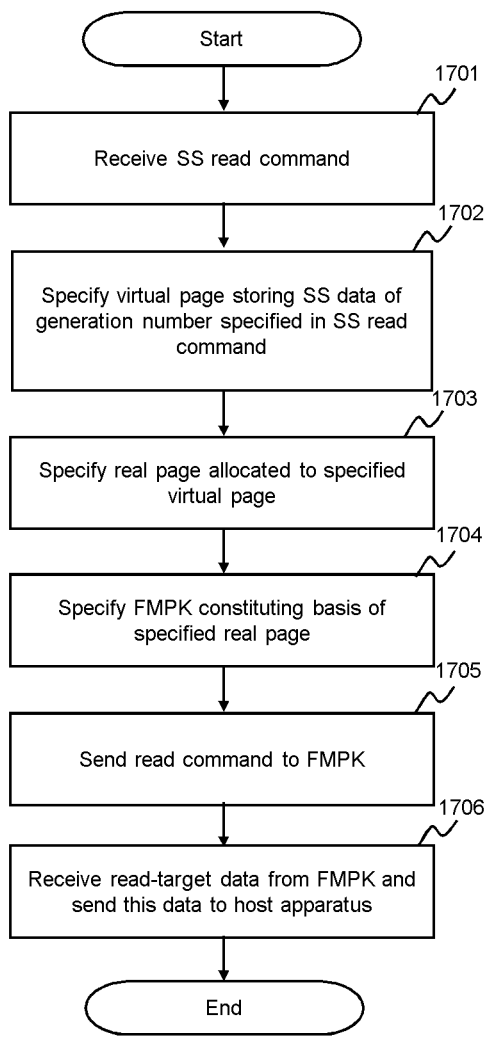
FIG. 17 shows an example of a SS data read process performed by the RAID controller 21.

FIG. 17 shows an example of a SS data read process performed by the RAID controller 21.

The RAID controller 21 receives a command (hereinafter SS read command) from the host apparatus 10 to read snapshot data (S1701). For example, a read source (a TP virtual LU # and a TP virtual address) and a generation number are specified in the SS read command. That is, the host apparatus 10 can send a snapshot acquisition command specifying the primary TP virtual LU, and, in addition, can manage the generation number (for example, the relationship between the generation number and a time point) with respect to the primary TP virtual LU. Thus, the host apparatus 10 can send the SS read command, which specifies a desired generation number, to the storage apparatus 1.

The RAID controller 21 specifies the virtual page storing the SS data of the generation number specified in the SS read command (S1702). Specifically, the RAID controller 21 performs the following processing of (17-1) through (17-4):

(17-1) use of the virtual page management table 223 to specify the virtual page, which is directly associated with the read-source primary virtual page and is storing the previous generation SS data;

(17-2) use of the virtual page management table 223 to determine whether or not the SS generation number 404 corresponding to the specified virtual page is the same as the generation number specified in the SS read command;

(17-3) in a case where the result of the determination in (17-2) is negative, use of the virtual page management table 223 to specify the virtual page, which is directly associated with the specified virtual page and is storing the previous generation SS data; and (17-4) performance of (17-2) with respect to the virtual page specified in (17-3). In a case where the result of the determination in (17-2) is affirmative, the identified virtual page is the virtual page storing the SS data of the generation number specified in the SS read command.

The RAID controller 21 uses the TP logical address management table 224 to identify the real page (the LU #601 and the logical address 602) allocated to the virtual page specified in S1702 (S1703).

The RAID controller 21 uses the LU configuration management table 221 to specify the FMPK 30, which constitutes the basis of the real page specified in S1703 (S1704).

The RAID controller 21 sends a read command to the FMPK 30 specified in S1704 (S1705). The read command-destination FMPK 30 performs the same processing as that of FIG. 16. The read command sent in S1705 is not a special read command in which a generation number is specified, but rather is the same read command as the normal read command sent in FIG. 15.

The RAID controller 21 writes the data read in response to the read command sent in S1705 to the cache memory 22, and sends this data from the cache memory 22 to the host apparatus 10 (S1706).

As described hereinabove, the RAID controller 21 can read SS data of a generation number specified by the host apparatus 10 from the FMPK 30 by sending a normal read command, and can provide this SS data to the host apparatus 10. In this example, the host apparatus 10 need to send the storage apparatus 1 a read command specifying a generation number, that is, a special read command. In one variation, by performing the following processing, even the host apparatus 10 may acquire SS data of a desired SS generation number without a special read command by sending a normal read command, which does not specify a SS generation number. Specifically, for example, the RAID controller 21 notifies the host apparatus 10 of information (a TP virtual LU #, a TP virtual address, and a SS generation number) related to the SS virtual page associated with the TP virtual address of the primary virtual page, and the host apparatus 10 stores this information by associating same with the TP virtual address of the primary virtual page, and in a case where the SS data is acquired, may send the storage apparatus 1 a read command specifying the TP virtual LU # and the TP virtual address corresponding to the desired SS generation number. In this variation, the host apparatus 10 comprises a path management program and an application program, which run on an OS (operating system), and the path management program recognizes the primary TP virtual LU and the pool TP virtual LU, and may conceal the pool TP virtual LU from the application program and manage information (the TP virtual LU #, the TP virtual address, and the SS generation number) related to the SS virtual page associated with the TP virtual address for each TP virtual address of the primary virtual page. In accordance with this, in a case where an SS generation number is specified by the application program, the path management program specifies the TP virtual LU # and the TP virtual address corresponding to this SS generation number, and may send a read command specifying the specified TP virtual LU # and TP virtual address to the host apparatus 10.

Figure 18:
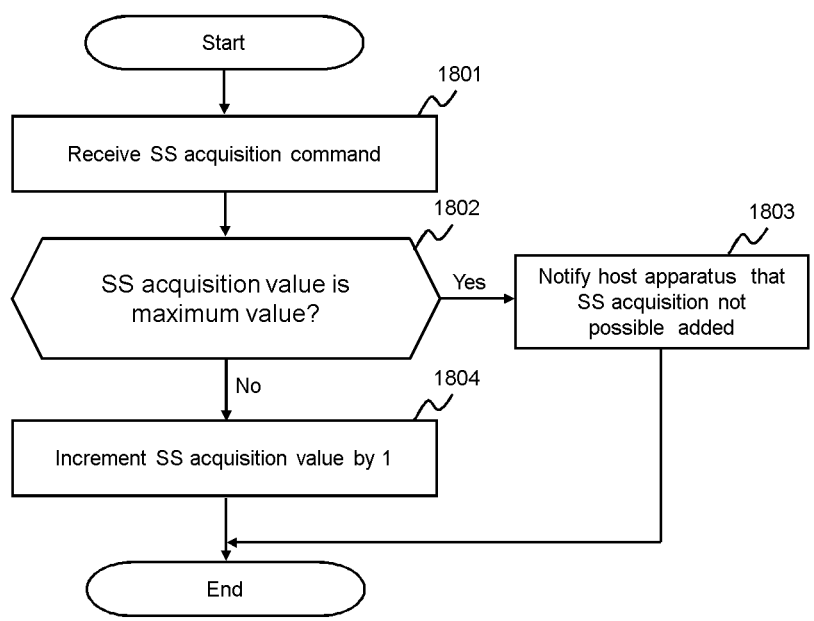
FIG. 18 shows an example of a SS acquisition process performed by the RAID controller 21.

FIG. 18 shows an example of a SS acquisition process performed by the RAID controller 21.

The RAID controller 21 receives a snapshot acquisition command (SS acquisition command) from the host apparatus 10 (S1801). The LU # of the primary TP virtual LU is specified in the SS acquisition command.

The RAID controller 21 uses the snapshot management table 222 to determine whether or not the snapshot acquisition value 304 of the primary TP virtual LU specified in the SS acquisition command is the maximum value (S1802). The maximum value of the snapshot acquisition value 304 here shows the maximum number of snapshots capable of being acquired. The maximum value of the snapshot acquisition value 304 may be determined beforehand at the design stage.

In a case where the snapshot acquisition value 304 is not the maximum value (S1802: No), the RAID controller 21 increments the snapshot acquisition value 304 of the specified primary TP virtual LU by 1.

Alternatively, in a case where the snapshot acquisition value 304 is the maximum value (S1802: Yes), the RAID controller 21 notifies the host apparatus 10 that it is not possible to acquire a snapshot (S1803).

Figure 19:
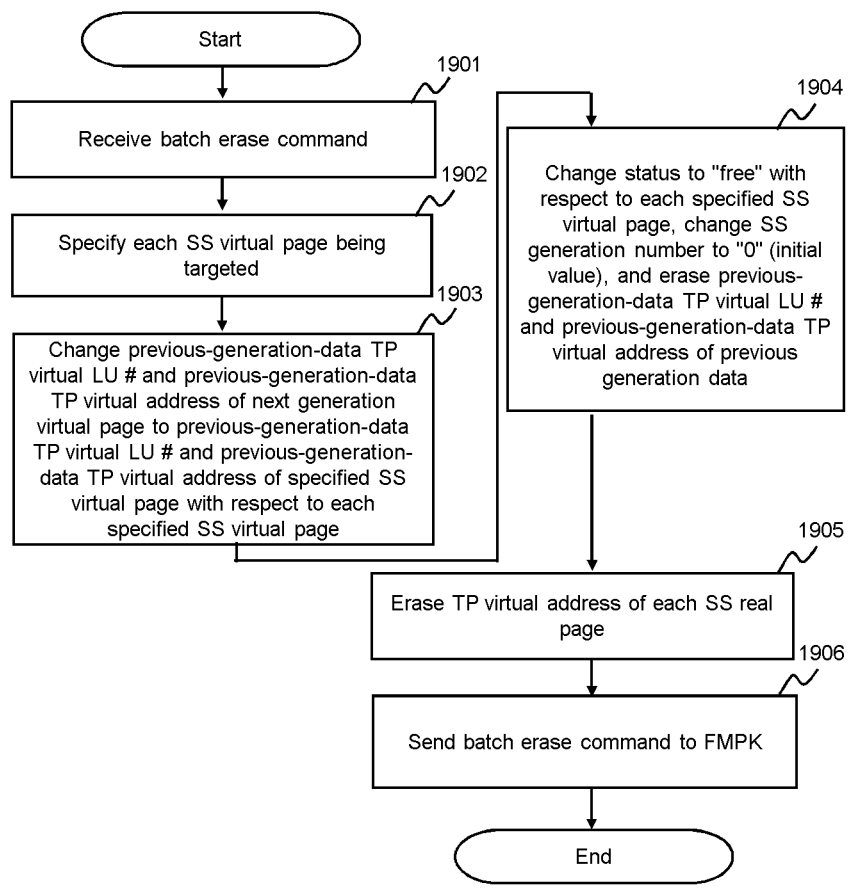
FIG. 19 shows an example of a SS data batch erase process performed by the RAID controller 21.

FIG. 19 shows an example of a SS data batch erase process performed by the RAID controller 21.

The RAID controller 21 receives a batch erase command from the host apparatus 10 (S1901). An erase-target SS data generation number is specified in the batch erase command here. In the SS data batch erase process, all SS data corresponding to the generation number specified in this command is erased en bloc in response to this command. However, the SS data batch erase process may be configured such that not only the SS data of the specified generation is erased like this, but rather all the SS data of the specified generation and of all the generations prior thereto are erased en bloc. Whether only the SS data of the specified generation is to be erased, or the SS data of the specified generation and all the generations prior thereto is to be erased, for example, may be determined in accordance with whether a prescribed bit in the batch erase command is a "1" or a "0". In this example, it is supposed that only the SS data of the specified generation is erased en bloc.

The RAID controller 21 references the virtual page management table 223, and identifies all the SS virtual pages corresponding to the generation number specified in the batch erase command (S1902).

The RAID controller 21 changes the TP previous-generation-data virtual LU #405 and the previous-generation-data TP virtual address 406 of the next generation virtual page of the SS virtual page to the previous-generation-data TP virtual LU #405 and the previous-generation-data TP virtual address 406 of the virtual page specified in S1902 with respect to each SS virtual page specified in S1902 (S1903).

For each virtual page specified in S1902, the RAID controller 21 changes the TP virtual page status 403 to "free", and, in addition, changes the SS generation number 404 to "0" (initial value), and, in addition, erases the previous-generation-data TP virtual LU #405 and the previous-generation-data TP virtual address 406 (S1904).

The RAID controller 21 erases the allocation of the SS real page with respect to each SS virtual page specified in S1902. That is, the RAID controller 21 erases the TP virtual LU #604 and the TP virtual address 605 from the TP logical address management table 224 with respect to each SS real page allocated to each SS virtual page specified in S1902 (S1905).

The RAID controller 21 sends a batch erase command specifying the generation number specified in the batch erase command received in S1901 to the FMPK 30, which constitutes the basis of the SS real page for which the allocation was erased in S1905 (S1906).

Figure 20:
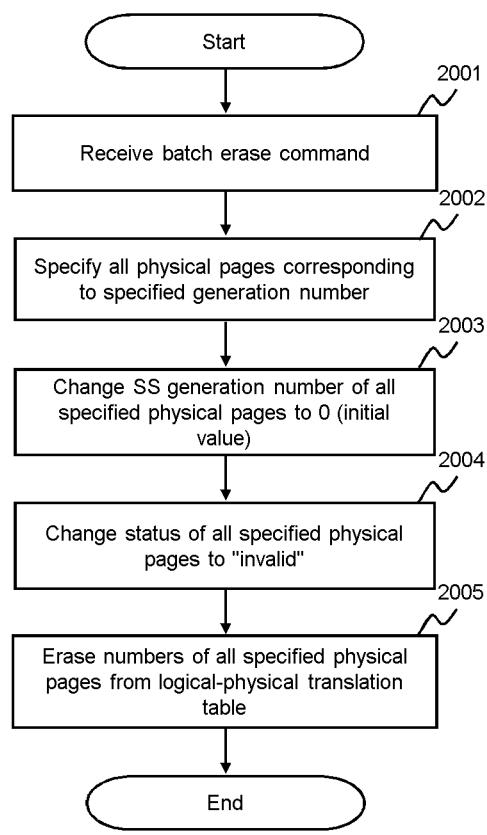
FIG. 20 shows an example of a SS data batch erase process performed by the FMPK 30 memory controller 31.

FIG. 20 shows an example of a SS data batch erase process performed by the memory controller 31 of the FMPK 30.

The memory controller 31 receives the batch erase command specifying the generation number from the RAID controller 21 (S2001).

The memory controller 31 uses the physical page management table 321 to identify all the physical pages corresponding to the SS generation number 704 matching the generation number specified in the received batch erase command (S2002).

The memory controller 31 updates the SS generation number 704 corresponding to the physical page specified in S2002 to "0" (initial value) (S2003).

The memory controller 31 updates the physical page status 702 of the physical page specified in S2002 to "invalid" (S2004).

The memory controller 31 erases the physical page #803 specified in S2002 from the logical-physical translation table 322 (S2005).

According to S2004 in the SS data batch erase process of FIG. 20, in a case where all the physical pages of a certain physical block have become invalid pages, the memory controller 31 may convert this physical block to a free physical block by erasing the data from this physical block. That is, the memory controller 31 may perform erase processing for a physical block and increase the number of free physical blocks without a reclamation process.

The reclamation process is for increasing the number of free physical blocks, and specifically, is a process for converting all the physical pages in a first physical block to invalid pages after copying all the valid data from the first physical block to a second physical block, and converting the first physical block to a free physical block by erasing the first physical block.

Figure 26:
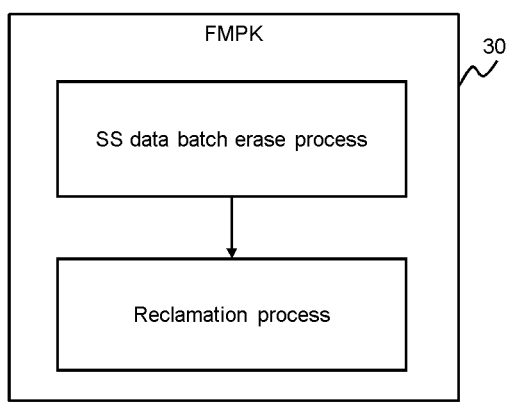
FIG. 26 shows reclamation processing subsequent to a SS data batch erase process performed by the FMPK 30 memory controller 31.

The reclamation process, for example, may be performed by the memory controller 31 of the FMPK 30 subsequent to the SS data batch erase process (immediately upon completion of the SS data batch erase process) as shown in FIG. 26.

Figure 21:
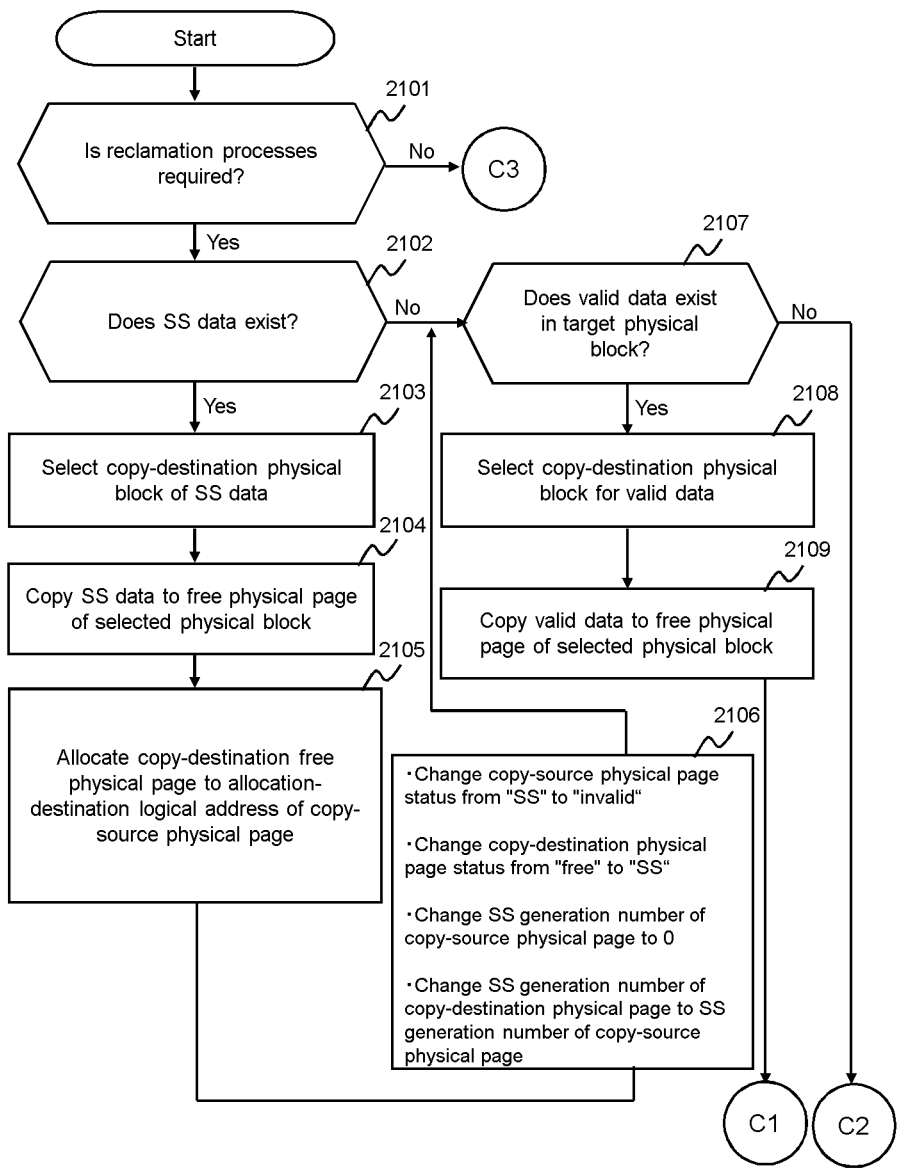
FIG. 21 shows an example of a reclamation process performed by the FMPK 30 memory controller 31.
Figure 22:
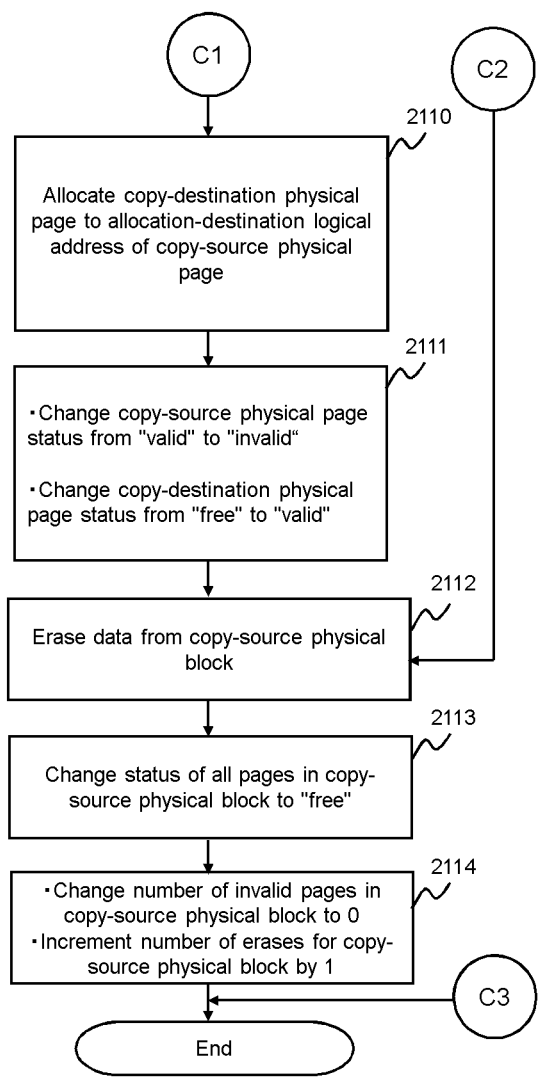
FIG. 22 shows the remainder of the example of the reclamation process performed by the FMPK 30 memory controller 31.

FIGS. 21 and 22 show an example of a reclamation process performed by the memory controller 31 of the FMPK 30.

The memory controller 31 determines whether the reclamation process is required for each physical block (S2102). A physical block for which the reclamation process is required, for example, is a physical block in which the number of invalid pages exceeds a prescribed threshold.

In a case where a physical block ("target block" in the explanation of FIGS. 21 and 22) requires reclamation processing (S2101: Yes), the memory controller 31 determines whether or not there is a SS page (a physical page with the status "SS") in the target block based on the physical page management table 321 (S2102).

In a case where a SS page exists (S2102: Yes), the memory controller 31 selects a copy-destination physical block for the SS data (data in the SS page) (S2103). As the copy-destination physical block, for example, a physical block with a relatively large number of erases (for example, the physical block having the largest number of erases) in the FMPK 30 for which this reclamation processing is being performed may be selected. This is because the SS page will not become an invalid page until the data in this SS page has been erased, and as such, it is expected to be difficult to increase the number of erases of the physical block including the SS page. For example, it is also possible to select a block having a larger number of erases than the copy-source block as the copy-destination block of the SS data.

The memory controller 31 copies the data in the SS page to a free physical page in the physical block selected in S2103 (S2104).

The memory controller 31 allocates the copy-destination free physical page in the logical-physical translation table 322 to the allocation-destination logical address 802 of the copy-source physical page (S2105).

The memory controller 31 changes the physical page status 702 of the copy-source physical page from "SS" to "invalid" and changes the physical page status 702 of the copy-destination physical page from "free" to "SS". The memory controller 31 also changes the SS generation number 704 of the copy-destination physical page to the same value as that of the SS generation number 704 of the copy-source physical page, and changes the SS generation number 704 of the copy-source physical page to "0" (initial value) (S2106).

In a case where a SS page does not exist (S2102: No), or subsequent to S2106, the memory controller 31 determines whether or not a valid page (a physical page with a status of "valid") exists in the target block (S2107).

In a case where a valid page exists (S2107: Yes), the memory controller 31 selects a physical block, which will become the copy destination of the data in the valid page (S2108). As the copy-destination physical block, for example, a physical block with a relatively small number of erases (for example, the physical block having the least number of erases) in the FMPK 30 for which this reclamation processing is being performed may be selected. This is because the valid data is updated by the data from the host apparatus 10, and as such, it is expected that the invalid pages in a physical block having a large number of valid pages are apt to increase, and that the number of erases will increase. As the copy-destination block for the valid data, for example, it is also possible to select a block having a smaller number of erases than the copy-source block.

In a case where a valid page does not exist (S2017: No), the memory controller 31 performs S2112.

The memory controller 31 copies the data in the valid page to a free physical page in the copy-destination physical block selected in S2108 (S2109).

The memory controller 31 allocates the copy-destination physical page in the logical-physical translation table 322 to the allocation-destination logical address 802 of the copy-source valid page (S2110).

The memory controller 31 changes the physical page status 702 of the copy-source physical page from "valid" to "invalid", and changes the physical page status 702 of the copy-destination physical page from "free" to "valid" (S2111).

Since the SS data and the valid data in the target block are copied to a different physical block, and all the physical pages in the target block transition to free pages or invalid pages, the memory controller 31 performs erase processing with respect to the target block (S2112).

The memory controller 31 changes the physical page status 702 of all the physical pages in the target block to "free" (S2113).

The memory controller 31 changes the number of physical pages 903 to "0" and increments the number of erases 904 by 1 with respect to the target block (S2114).

Example 2

Example 2 will be explained hereinbelow. In so doing, mainly the points of difference with Example 1 will be explained, and explanations of the points in common with Example 1 will be either simplified or omitted.

Figure 23:
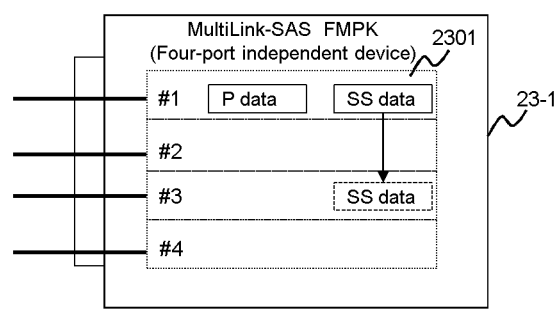
FIG. 23 shows a number of examples of extended FMPKs related to Example 2.
Figure 23:
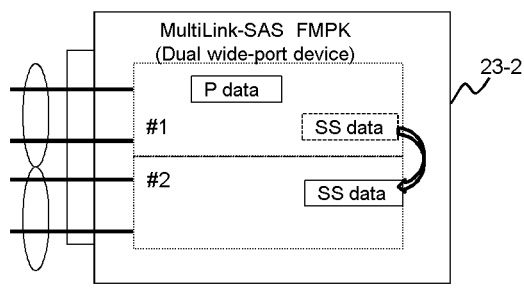

FIG. 23 shows a number of examples of extended FMPKs.

An extended FMPK 23 is an FMPK, which is capable of creating a logical partition 2301 in accordance with Multi-Link-SAS (Serial Attached SCSI) technology. The storage apparatus 1 comprises an extended FMPK 23 as an example of a storage device, which is coupled to the storage controller 20.

A memory controller (hereinafter, extended memory controller) in the extended FMPK 23 manages N (where N is an integer of 2 or larger) logical partitions 2301 obtained by logically dividing the extended FMPK 23 (for example, at least a group of FMs). One or more links conforming to SAS are coupled to one logical partition 2301. The extended FMPK 23 is recognized by the storage controller 20 as N FMPKs rather than one FMPK.

The extended memory controller can migrate page data (physical page data) between logical partitions 2301.

Primary data (data in a primary real page) and SS data are respectively stored in two different physical pages, and these two physical pages are respectively allocated to two different logical addresses.

In an extended FMPK 23-1 according to a first example, a single link (for example, one physical port) is coupled to each of four logical partitions #1 through #4. In addition, in the extended FMPK 23-1, a group of physical blocks belonging to the logical partitions #1 and #2 of the four logical partitions #1 through #4 is an area for storing P data, and a group of physical blocks belonging to the logical partitions #3 and #4 is an area for storing SS data. For example, in a case where a certain page data in a first logical partition is regarded as SS data, the extended memory controller migrates this SS data from the first logical partition #1 to a free physical page in either a third logical partition #3 or a fourth logical partition #4. In accordance with this, the extended memory controller allocates a copy-destination physical page to an allocation-destination logical address of a copy-source physical page instead of to the copy-source physical page.

Thus, a link (port) used for a read from the P data and a link (port) used for a SS data read can be separated. This makes it possible to avoid P data and SS data reads from being concentrated on a single link.

In an extended FMPK 23-2 according to a second example, a single wide link (wide port), which is formed using two links, is coupled to each of two logical partitions #1 and #2. A group of physical blocks belonging to the logical partition #1 is an area for storing P data, and a group of physical blocks belonging to the logical partition #2 is for storing SS data. In a case where page data in the logical partition #1 changes from P data to SS data, the SS data is migrated from the logical partition #1 to the logical partition #2.

A number of examples have been explained hereinabove, but the present invention is not limited to these examples.

For example, a LU (real LU) based on one or more storage devices (for example, FMPKs) may be used instead of the TP virtual LU. In accordance with this, the TP virtual LU # described above can be read as LU #, and the TP virtual address can be read as virtual address.

Furthermore, for example, the storage apparatus 1 may be a standalone FMPK comprising multiple FMs. In accordance with this, the memory controller 31 may comprise the same functions as the RAID controller 21, and the TP virtual LU can be read as logical space, which is configured from multiple logical pages, the virtual page can be read as logical page, and the real page can be read as physical page.

REFERENCE SIGNS LIST

1 Storage apparatus
10 Host apparatus
20 Storage controller
30 FMPK (Flash memory package)

The invention claimed is:
1. A storage apparatus including a storage controller and multiple storage devices, wherein
  each of the multiple storage devices includes multiple semiconductor memory chips and a memory controller configured to provide a logical address space associated with the multiple semiconductor memory chips to the storage controller;
  the storage controller is configured to provide a primary virtual volume and a snapshot (SS) virtual volume which is related to the primary virtual volume to a host computer;
  the primary virtual volume includes a first virtual address for storing a first data, the first virtual address is associated with a first logical address of a first logical address space provided by a first storage device of the multiple storage devices, and the first logical address is associated with the first data stored in a first physical area of the multiple semiconductor memory chips included in the first storage device;

the storage controller is configured to:
receive a first write command with second data from the host computer, the first write command indicating the first virtual address for updating the first data to the second data;
change the first virtual address of the primary virtual volume to a second virtual address of the snapshot virtual volume for maintaining the first data as a snapshot data;
change the first logical address to a second logical address associated with the second virtual address; and
send a second write command with the second data to the first storage device, the second write command indicating the first logical address for updating the first data to the second data and including the second logical address for maintaining the first data as snapshot data; and
a first device controller of the first storage device is configured to:
store the second data in a second physical area of the multiple semiconductor memory chips;
associate the second data and the first logical address; and
associate the first data and the second logical address according to the second write command.

2. A storage apparatus according to claim 1 wherein:
the second write command includes a generation number of the first data; and
the first storage device is configured to manage the generation number associated with the first data.

3. A storage apparatus according to claim 2, wherein the storage controller is configured to send an erase command specifying a generation number to any storage device of the multiple storage devices, and
the storage device is configured to perform a SS batch erase process for managing either all the physical areas corresponding to the generation number specified in the erase command, or all the physical areas corresponding to this generation number and an number of a generation older than this generation number.

4. A storage apparatus according to claim 3, wherein
each storage device comprises multiple physical blocks each comprising multiple physical pages, and is configured to read and write data in units of physical pages and to erase data in units of physical blocks; and
the storage device, which has performed the SS batch erase process, is configured to manage, in a case where a physical block in which all the physical pages are invalid physical pages is created in accordance with the SS batch erase process, the physical block in which all the physical pages are invalid physical pages as a free physical block, by erasing the data from the physical block in which all the physical pages are invalid physical pages.

5. A storage apparatus according to claim 3, wherein
each storage device comprises multiple physical blocks each comprising multiple physical pages, is configured to read and write data in units of physical pages and to erase data in units of physical blocks, and, in addition, is configured to be able to perform a reclamation process; and
the reclamation process is a process including
copying data from a physical page storing valid data in a first physical block to a free physical page in a second physical block;
managing the physical page as an invalid physical page after copying the data; and
managing the first physical block as a free physical block after erasing the data from the first physical block.

6. A storage apparatus according to claim 5, wherein, the reclamation process further includes
copying data from a valid physical page in the first physical block to a free physical page in a third physical block, which is different from the second physical block; and
managing the valid physical page as an invalid physical page.

7. A storage control method of a storage apparatus,
wherein the storage apparatus includes a storage controller and multiple storage devices, each of the multiple storage devices includes multiple semiconductor memory chips and a memory controller configured to provide a logical address space associated with the multiple semiconductor memory chips to the storage controller;
a primary virtual volume and a snapshot virtual volume which is related to the primary virtual volume are provided to a host computer; and
the primary virtual volume includes a first virtual address for storing a first data, the first virtual address is associated with a first logical address of a first logical address space provided by a first storage device of the multiple storage devices, and the first logical address is associated with the first data stored in a first physical area of the multiple semiconductor memory chips included in the first storage device,
wherein the storage method comprises:
receiving a first write command with second data from the host computer, the first write command indicating the first virtual address for updating the first data to the second data;
changing the first virtual address of the primary virtual volume to a second virtual address of the snapshot virtual volume for maintaining the first data as a snapshot data;
changing the first logical address to a second logical address associated with the second virtual address;
sending a second write command with the second data to the first storage device, the second write command indicating the first logical address for updating the first data to the second data and including the second logical address for maintaining the first data as snapshot data;
storing the second data in a second physical area of the multiple semiconductor memory chips;
associating the second data and the first logical address; and
associating the first data and the second logical address according to the second write command.

* * * * *